US008868957B2

(12) United States Patent
Davis et al.

(10) Patent No.: US 8,868,957 B2
(45) Date of Patent: Oct. 21, 2014

(54) AUXILIARY POWER SUPPLY, A METHOD OF PROVIDING POWER TO A DATA STORAGE SYSTEM AND A BACK-UP POWER SUPPLY CHARGING CIRCUIT

(75) Inventors: David M. Davis, Portsmouth (GB); Alan Westrop, Winchester (GB)

(73) Assignee: Xyratex Technology Limited, Havant (GB)

( * ) Notice: Subject to any disclaimer, the term of this patent is extended or adjusted under 35 U.S.C. 154(b) by 892 days.

(21) Appl. No.: 12/880,511

(22) Filed: Sep. 13, 2010

(65) Prior Publication Data

US 2011/0072290 A1 Mar. 24, 2011

Related U.S. Application Data

(60) Provisional application No. 61/245,466, filed on Sep. 24, 2009.

(51) Int. Cl.
| | |
|---|---|
| *G06F 1/00* | (2006.01) |
| *G06F 11/30* | (2006.01) |
| *G06F 1/30* | (2006.01) |
| G06F 11/14 | (2006.01) |
| H02J 9/06 | (2006.01) |
| G06F 11/20 | (2006.01) |

(52) U.S. Cl.
CPC .............. *G06F 1/30* (2013.01); *G06F 11/1441* (2013.01); *H02J 9/061* (2013.01); *G06F 11/2015* (2013.01)
USPC ........... 713/340; 713/300; 713/320; 713/324; 711/114; 320/127; 320/128; 320/137; 714/14

(58) Field of Classification Search
USPC ................. 713/300, 320, 324, 340; 711/114; 320/127, 128, 137; 714/14
See application file for complete search history.

(56) References Cited

U.S. PATENT DOCUMENTS

| 5,379,417 | A | * | 1/1995 | Lui et al. ....................... 713/300 |
|---|---|---|---|---|
| 5,799,200 | A | | 8/1998 | Brant et al. |
| 7,486,046 | B2 | * | 2/2009 | Chou ............................. 320/107 |
| 7,584,325 | B2 | * | 9/2009 | Holland et al. ............... 711/114 |
| 8,041,468 | B2 | * | 10/2011 | Olarig et al. .................. 700/299 |
| 8,074,112 | B1 | * | 12/2011 | Chang et al. .................... 714/14 |
| 8,129,947 | B2 | * | 3/2012 | Chiasson et al. ............. 320/132 |
| 8,370,659 | B2 | * | 2/2013 | Chiasson et al. ............. 713/320 |
| 2005/0121979 | A1 | | 6/2005 | Matsumoto et al. |
| 2008/0030078 | A1 | | 2/2008 | Whitted et al. |
| 2008/0100143 | A1 | * | 5/2008 | Lipcsei ............................ 307/80 |
| 2008/0268331 | A1 | * | 10/2008 | Douglas ........................ 429/100 |
| 2009/0108677 | A1 | * | 4/2009 | Walter et al. .................... 307/80 |
| 2010/0023715 | A1 | * | 1/2010 | Jibbe et al. .................... 711/162 |
| 2010/0045248 | A1 | * | 2/2010 | Hawley ........................ 323/282 |
| 2010/0115321 | A1 | * | 5/2010 | Fujimoto et al. ............. 713/340 |
| 2011/0289272 | A1 | * | 11/2011 | Chu et al. ..................... 711/114 |

* cited by examiner

*Primary Examiner* — Jaweed A Abbaszadeh
(74) *Attorney, Agent, or Firm* — Pillsbury Winthrop Shaw Pittman LLP (57) ABSTRACT

The invention provides a data storage system, comprising: one or more data storage media; a midplane to which the one or more data storage media are, in use, connected; at least one input/output module for providing control of data transfer between the or each of the data storage media and one or more hosts to which, in use, the data storage system is connected; and a back-up power supply to provide power to the input/output modules in the event of a failure of regular power sources therefor, the back-up power supply being provided separately from the at least one input/output module.

27 Claims, 5 Drawing Sheets

AUXILIARY POWER SUPPLY, A METHOD OF PROVIDING POWER TO A DATA STORAGE SYSTEM AND A BACK-UP POWER SUPPLY CHARGING CIRCUIT

CROSS REFERENCE TO RELATED APPLICATIONS

This application claims priority to U.S. Provisional Application No. 61/245,466, filed Sep. 24, 2009. The content of this application is incorporated herein by reference in its entirety.

FIELD

The present invention relates to an auxiliary power supply within a data storage system, a method of providing power to a data storage system, a back-up power supply charging circuit and a method of charging a back-up power supply.

BACKGROUND

Within a data storage system there is typically provided an input/output system or subsystem such as input/output (I/O) module connected to one side of an interface such as a midplane. On the other side of the midplane are typically connected one or more storage devices such as hard disks or other such storage media. The I/O module serves to write data to and read data from the one or more storage devices. An AC mains power supply, the primary power source, is typically connected to the storage system to provide the necessary power for the device to operate.

There are of course other examples of data storage systems such as a processor system, e.g. an ATX server, specific silicon such as a RAID ASIC or a switch device as might be provided in a Serial Attached SCSI (SAS) expander.

Description from hereon in will be largely with reference to a storage system including one or more input/output modules but it will be appreciated that the principles discussed herein apply to all data storage systems having input/output systems or subsystems.

Some I/O modules store received data in cache memory, responding to the external host system to inform it that the data has been written to the storage media, when in fact it is still held in volatile memory within the I/O module. This data will typically be subject to some form of processing before being written to the storage media. Any cache data in volatile storage is vulnerable to loss and thus in the event of an AC mains power failure, control of the elements of the system is required to ensure that the retention of the data is consistent and reliable.

Typically, in current systems, that function is provided by batteries mounted within the I/O module. In the event of an AC mains power failure the batteries mounted within the I/O module serve to maintain RAM within the module in a self-refresh mode for a period of time. The normal period of retention is approximately 72 hours, which is sufficient to retain the data over a weekend's power outage (Friday evening to Monday morning). The retention period is of course dependant on the type and amount of RAM to be maintained.

Typically, on notification of primary power loss this type of system switches the RAM to self-refresh mode and then lets the rest of the system fail due to the loss of primary AC mains power. On restoration of power the system recognises that it has a 'dirty cache' and ensures that data cached in RAM is written to disk.

Figure 1A:
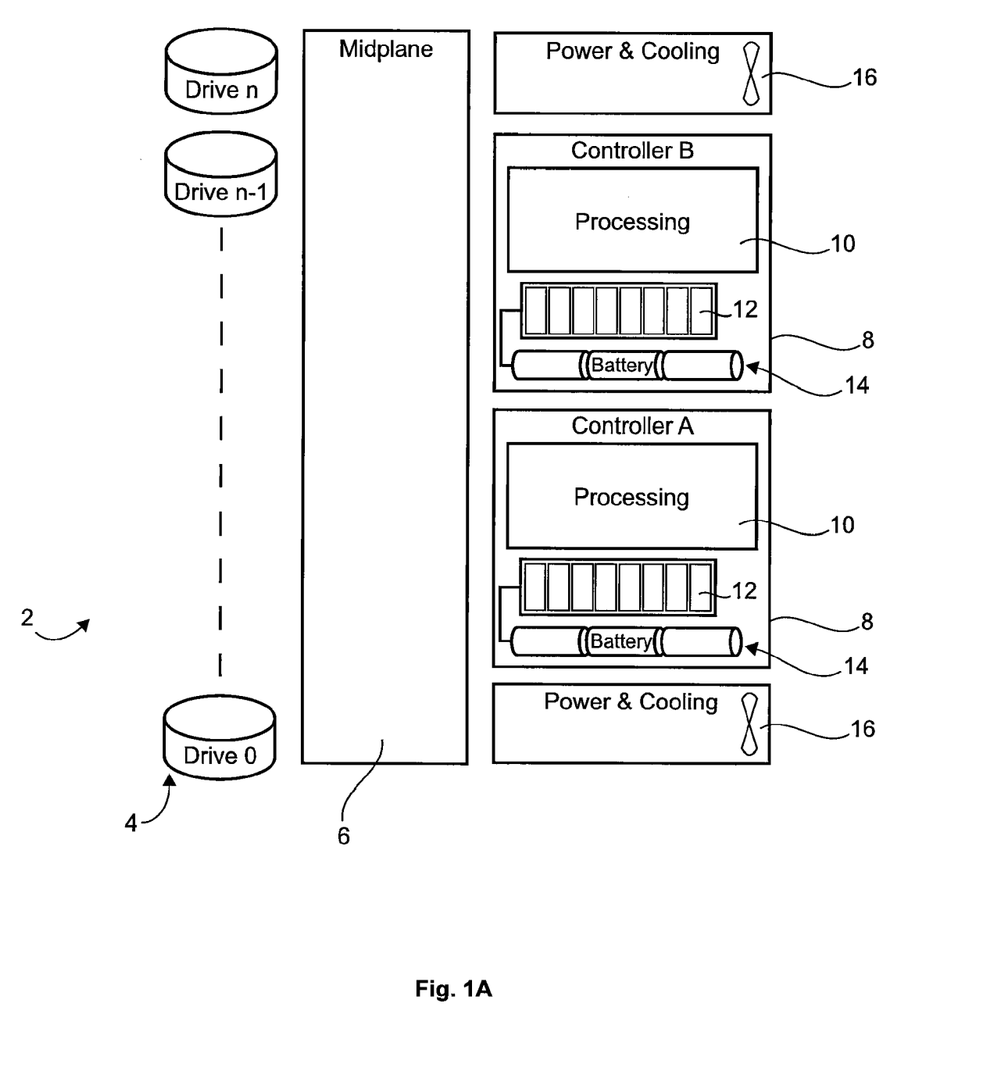
FIG. 1A is a schematic representation of a data storage system.

FIG. 1A shows a schematic representation of a conventional data storage system 2. The system 2 comprises plural, n in this case, disk drives 4 connected via a midplane 6 to two I/O modules or controllers 8. Each of the I/O modules 8 contains onboard processing capability 10 together with memory 12. The I/O modules or controllers 8 serve to provide control of data transfer between one or more hosts (not shown) and the plural disk drives 4.

A battery unit 14, containing one or more batteries, is provided on each of the I/O modules or controllers 8 to provide back-up power in the case of an interruption in power from the AC power supply units 16. As explained above, as processing capacity and data capacity increases so does the power requirement and hence the required battery size or capacity for providing back-up.

Figure 1B:
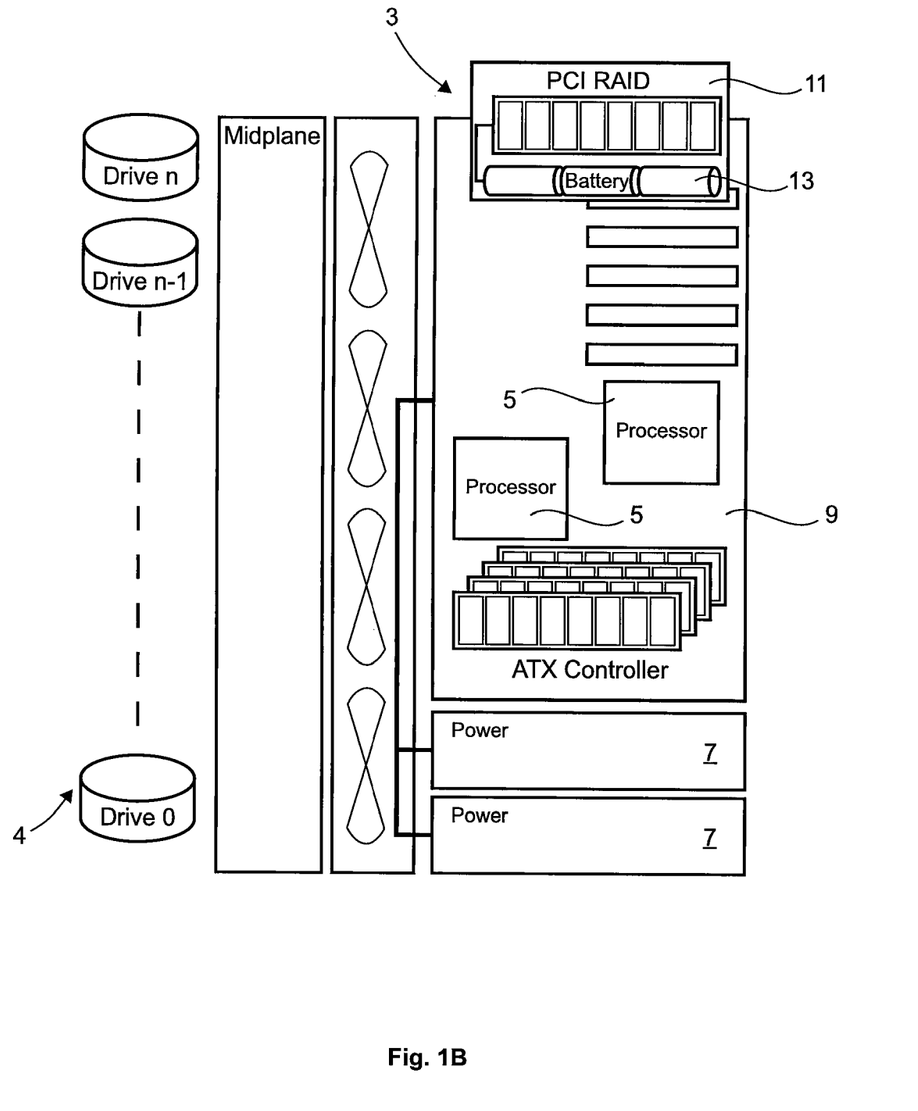
FIG. 1B is a schematic representation of an ATX-based RAID system.

FIG. 1B shows a schematic representation of a typical ATX server system as might be used to implement a RAID system. The server system 3 comprises a number of processors 5 and power supplies 7 provided on an ATX motherboard 9. A PCI RAID card or RAID controller 11 is provided. Plural disks or drives 4 are provided to which data is written in accordance with the RAID type being implemented.

In normal use the ATX server system and PCI RAID card 11 is mains powered via the power supplies 7. The PCI RAID card 11 includes a battery 13 which provides a back-up power supply to the ATX server system in the event of failure of the mains AC power supply. As in the example described above with reference to FIG. 1A, as processing capacity and data capacity of the RAID system increases, the required battery size or capacity for providing back-up increases too.

As an alternative to battery power, some current power back-up systems use "supercapacitors" to maintain the RAM in self-refresh mode for the necessary period of time. The use of supercapacitors can be advantageous as a maintenance free alternative to internal batteries.

In addition, some manufacturers use external Uninterruptable Power Supply (UPS) systems to maintain the whole system, either for the period of outage, or until the essential data in RAM can be written to disk or non-volatile storage.

There are a number of problems with currently available systems. Due to customer requirements for increased performance, RAID 6 etc. I/O module power is increasing, and contains more memory. The increasing memory requirements mean that back-up batteries need to be larger to provide the same period of retention. However, the increasing performance and power of modules means that the I/O module is becoming very dense, with little space for any battery. Furthermore, as the performance and power of modules increases, the temperature of the environment can increase which is not particularly good for a battery. Indeed, in some situations, it is possible that the temperature can reach levels that are detrimental to the battery.

Since the battery is only providing a hold up to the memory, if the battery becomes exhausted, the back-up fails and data is lost. Degradation of battery capacity due to temperature stress can significantly reduce the hold-up time.

External UPS systems provide a similar function to a system mounted battery, but by definition are less integrated with the enclosure. This makes their control of the systems shutdown less efficient and the systems knowledge of the UPS state less reliable. Any external UPS is likely to have to provide holdup for the total system including I/O modules, fans and disk drives or whatever other such storage media are included in the system.

Any external UPS would provide AC to the enclosure which would add further conversion inefficiency to the system, thus requiring even more power.

U.S. Pat. No. 5,799,200 discloses a method and apparatus for preserving data in a system having Dynamic Random Access memories (DRAM). A Flash RAM and a small auxiliary power source are utilised by a controller independently of the system to transfer the stored contents of the DRAM to the Flash RAM immediately upon loss of primary system power.

US-A-2005/0121979 discloses battery packs with a plurality of rechargeable batteries connected in series so as to obtain a voltage required by a load device. The battery packs are for the provision of an uninterruptable power supply within a computer. The battery packs are detachably accommodated in a case. The battery packs are connected in parallel and each output thereof is modified to a predetermined voltage by a discharge control section.

SUMMARY

According to a first aspect of the present invention, there is provided a data storage system, comprising an interface to which the one or more data storage media may, in use, be connected; at least one input/output module for providing control of data transfer between the or each of the data storage media and one or more hosts to which, in use, the data storage system is connected; and a rechargeable back-up power supply to provide power to the input/output modules in the event of a failure of one or more primary power source therefor, the back-up power supply being provided separately from the at least one input/output system.

Within the specific technical area of data storage systems it is conventional to include backup power supplies within the I/O modules or systems. In contrast to this, in the present system, the back-up power is not a part of the I/O system. In the case of an input/output module as used in a storage system, the back up power supply is not in the input/output module. In the case of an ATX server for example, the RAID battery may be on a plug-in PCI card, or separately within the enclosure ATX system enclosure. This provides numerous technical advantages as discussed in detail below.

In one example, a server-based storage system is provided in which an ATX motherboard is actually fixed in an enclosure and RAID function is provided by add-in PCI cards. Thus, the back-up power is not a part of the ATX server itself, but rather is provided separately. In contrast to known systems in which such back-up power is provided as part of the RAID controller, in the present system, the back-up power system is provided separately from the ATX server.

According to a second aspect of the present invention, there is provided a method of providing back-up power to a data storage system comprising one or more data storage media, an interface, such as a midplane, to which the one or more data storage media are, in use, connected, at least one input/output module for providing control of data transfer between the or each of the data storage media and one or more hosts to which, in use, the data storage system is connected; and a back-up power supply to provide power to the input/output modules in the event of a failure of regular power sources therefor, the method comprising: in the event of failure of the primary power supply for the data storage system, shutting down power to the one or more data storage media thereby reducing power requirements of the data storage system.

Preferably, the data storage system comprises a power supply rail to supply power to components of the data storage system, the power supply rail being arranged to provide power to charge the back-up power supply when the primary power source is operative. The use of a system power rail to provide charging power is particularly advantageous.

With the back-up power supply being provided separately from the I/O module it is important when a battery source is used, that its charge is maintained at an appropriate level so that it is ready for use at all times. A battery is charged by providing a flow of current into the battery until the level of charge retained has reached an appropriate level. This is often accompanied by an increase in battery terminal voltage to a level that may be significantly greater than the nominal voltage of the cell or cells and varies with the chemistry of the battery.

When providing a battery based back-up supply it is advantageous for the battery voltage to be as close as possible to the working voltage of the supply rail into which it feeds, to maintain similar characteristics from both power sources. In other words, it is desirable that the characteristics of the back-up power supply and the primary power source are similar, i.e. that the primary and back-up power forces have a similar initial voltage. In addition, the voltage drop of the back-up source during the back-up event must remain within the operating range of the circuits it is arranged to power.

Most existing battery charge circuits rely on a positive differential between the battery and the supply rail which provides the charge voltage to ensure adequate current flow to charge the battery. To achieve this, a minimum level of 'headroom' is required if the battery is to be charged from the rail to which it will provide back-up power. In other words, the potential of the charging rail has to be higher than the potential to which it is desired to charge the battery. This voltage difference results in a reduction of the rail voltage at the time of AC failure as the source of power changes from primary to secondary, i.e. from AC mains to battery. The battery will, of necessity, be at a lower potential than that of the power supply from which it was charged.

One means of overcoming this deficiency is to provide an additional power source with a higher voltage to charge the battery to a sufficiently high level to minimize the differential between rail voltage and back-up voltage. However, this adds significant extra cost to the system and is thus undesirable.

Periodic discharging and re-charging of certain battery chemistries is recommended to ensure the continued health of the battery. A known method of discharge, to ensure minimal disturbance to the normal operation of the system, is to connect the battery to an additional resistive load. The discharge dissipates the stored energy from the battery as heat which subsequently has to be removed from the enclosure. Energy is wasted in this way and so the overall efficiency of the system is considerably reduced.

According to a third aspect of the present invention, there is provided a back-up power supply charging circuit, for connection to a power rail of a data storage system, the back-up power supply charging circuit being arranged to charge a back-up power supply for the data storage system, the circuit comprising: an energy storage device for receiving energy from a said power rail; a first switching circuit for enabling power to be provided to the energy storage device from the power rail; and a second switching circuit for enabling power to be transferred from the energy storage device to a back-up power source for charging.

According to a fourth aspect of the present invention, there is provided a method of charging a back-up power supply for a data storage system, the back-up power supply being arranged to provide power to the data storage system in the event of the failure of a primary power source and being, in use, connected to a power supply rail of the data storage system, the method comprising: when power is available from the primary power source, activating a first switching circuit to enable power to be provided to the energy storage device from the power rail; and, subsequently, activating a second switching circuit to enable power to be transferred from the energy storage device to a back-up power source for charging.

According to a fifth aspect of the present invention, there is provided a rechargeable back-up power supply source for a data storage system, the back up power supply source comprising one or more rechargeable batteries; a back-up power supply charging circuit, for connection to a power rail of a data storage system, the back-up power supply charging circuit being arranged to charge a back-up power supply for the data storage system, the circuit comprising: an energy storage device for receiving energy from a said power rail; a first switching circuit for enabling power to be provided to the energy storage device from the power rail; a second switching circuit for enabling power to be transferred from the energy storage device to a back-up power source for charging; and a third switching circuit arranged to enable connection of the one or more rechargeable batteries to the power rail to provide power thereto in the event of a primary power source failure.

According to a sixth aspect of the present invention, there is provided a method of providing back-up power to a data storage system in the event of primary power source failure, the data storage system comprising a power supply rail from which power is provided to components of the data storage system, the method comprising: providing a back-up power supply source according to the fifth aspect of the present invention; in the event of primary power source failure, smoothly switching to the back-up power source by activating the third switching circuit.

BRIEF DESCRIPTION OF THE DRAWINGS

Embodiments of the present invention will now be described by way of example with reference to the accompanying drawings, in which.

DETAILED DESCRIPTION

Figure 2A:
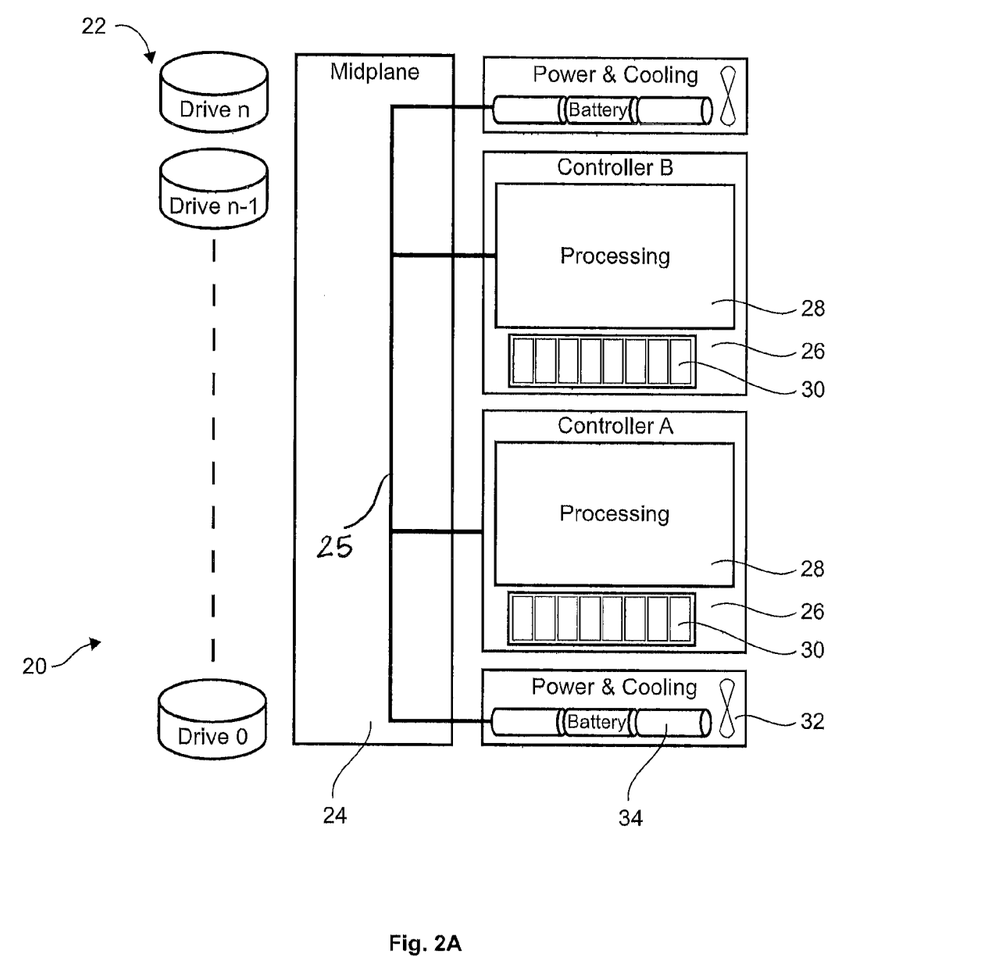
FIG. 2A is a schematic representation of a data storage system.
Figure 2B:
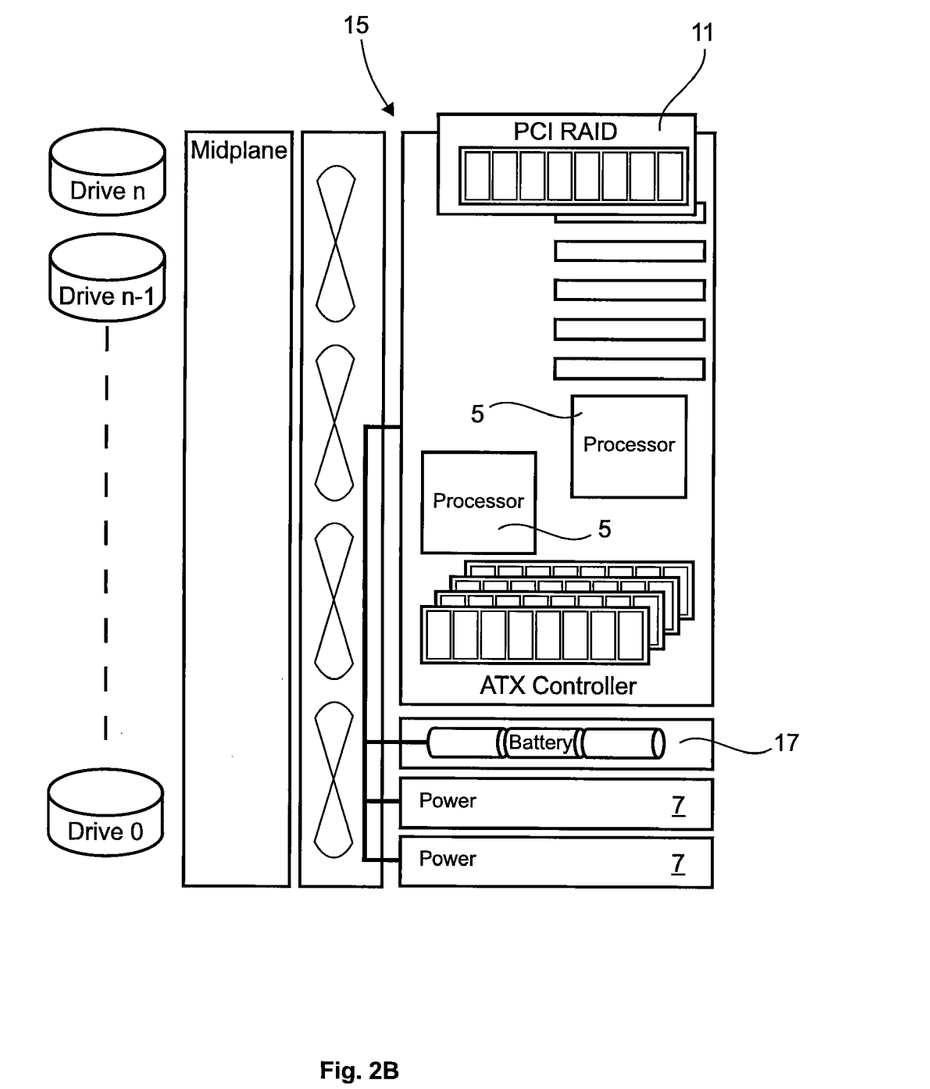
FIG. 2B is a schematic representation of an ATX-based RAID system.

FIG. 2A is a schematic representation of a data storage system. In the example of FIG. 2 the system 20 comprises plural, n in this case, disk drives 22 connected via a midplane 24 to two I/O modules or controllers 26. In some cases instead of providing I/O modules other forms of input/output systems or susbsytems may be provided. For example, in the case of an ATX server, a RAID battery may be provided on a plug-in PCI card, or separately within the ATX system enclosure (as described below with reference to FIG. 2B).

In one example, a server-based storage system is provided in which an ATX motherboard is actually fixed in an enclosure and RAID function is provided by add-in PCI cards.

From hereon in description will relate in the examples given to a storage system comprising dedicated input/output modules. Each of the I/O modules 26 contains onboard processing capability 28 together with memory 30. As is usual, separately from the I/O modules or controllers 26, a conventional power supply unit 32 is provided arranged to provide AC mains power to the controllers 28. In addition to the usual AC power supply, a back-up power supply is provided in the form of a battery unit 34. The battery unit 34 contains one or more batteries arranged to provide power to the controllers 26 upon detection of a power failure from another source, e.g. the normal AC power supply. The system 20 includes a power rail 25 via which power within the system is distributed. It is preferred that the battery unit 34 is charged up from the power rail 25 at times when the primary power source is operative. This means that separate charging circuitry and/or power sources are not required.

The location of a support battery outside of an I/O module, but still within the system, allows it to be easily monitored and controlled by the system. Typically, in use, when the primary AC mains power supply fails, the support battery 34 maintains the system for sufficient time to write any data in RAM to non-volatile storage provided within the I/O module. Any suitable type of non-volatile memory may be provided such as Flash, Disk or SSD.

In use, when a loss of primary AC mains power supply is recognised by the power supply, this is signalled to battery control circuits (not shown) within the power supply units 32. In addition, it is preferred that the fact that there has been a loss of AC power is also signalled to Enclosure Management processors (not shown) within both I/O modules 26. The battery control circuits may be located within the battery pack, to minimise cost for power supplies not provided with back-up battery power. In other words, the back-up battery supply and associated control circuit may be self-contained.

The enclosure management processors check whether redundant power will be maintained, by checking whether or not AC power supply from the other power supplies in the system is sufficient and acceptable. If redundant power is to be lost, the I/O modules 26 initiate an emergency system shutdown. To do this, any incoming transactions from a system Host are stopped. Any outgoing transactions from the I/O module 26 to the drives either from the in module initiator or SAS Expander that will be included within the I/O module 26 are halted.

Action is taken to minimise external system power by using drive power control to shut off power to the disk drives 22. In addition, internal I/O module power is minimised. This may be achieved by steps including shutting down PHYs on associated expander devices, shutting off secondary or supporting chipsets and potentially reducing processor clock speeds to reduce power. It may optionally also include shutting down Host PHYs although some notification of failure is preferably sent to the host before shutting these down. Although not the way conventional systems operate, by shutting down the disk drives by cutting their power, the overall power requirements of the data storage system is significantly reduced to a level whereby the power required by an auxiliary power supply is similarly significantly reduced.

As an example, for a 4U 24 drive system, disk drive power is approx 456 W compared with the rest of the system being 564 W. Thus, disk drive power requirements, amount to 45% of the required power. Avoiding this additional power draw prevents very high current requirements being drawn from the battery, which would otherwise potentially reduce its voltage and lead to an uncontrollable resetting of the system with an associated data loss.

To preserve data, cached data that is stored temporarily within the I/O module 26 is written out to non-volatile memory 30 within the I/O module 26. As mentioned above, any suitable form of non-volatile memory 30 may be used. Importantly, since the cached memory is written to non-volatile memory, the time limit of previous systems is avoided. To avoid data loss, it is no longer necessary to continually power volatile memory within the I/O module to refresh the cached data until an operator can restore full operation.

Indeed, once data stored in cache memory has been written or "flushed" to non-volatile memory, a graceful shutdown of the controller and system is initiated. Depending on available power from the back-up power system 34, the controller may also create a detailed log of events. Typically the battery unit 34 is able to provide power long enough for the cached data to be written to non-volatile memory. A period of three minutes is currently provided. The battery capacity may be tailored to correspond to the demanded or required watt-hours. This will enable back-up power requirements to be met with optimal battery capacity. This means that data recovery can be structured as the data may be written to the non-volatile memory in the form in which it would have been written to the disks. Clearly, it is preferable that the battery unit is maintained in as high a degree of charge as possible so as to provide as long a period as possible for structured writing of the cached data to the non-volatile memory.

Whilst the I/O module 26 is minimising the power requirement and writing data to the non-volatile memory, the Power Supply 32 serves to provide cooling for both the system and the battery. To provide cooling to the battery 34, the fan speed is preferably set to full. Typically under a fault condition the fans are set to full, however, since fans are high power at full speed, their speed may be controlled to minimise power and maximise battery time. Since the controller power is maintained, the enclosure management can still make this kind of decision. As the controller power is maintained, the enclosure management may adopt a specific algorithm to optimise extraction of latent heat from within the enclosure and control the battery temperature rise within pre-defined limits whilst at the same time minimising the total power drawn.

Typically, the batteries provided may be Lithium ion batteries, e.g. Li ion Phosphate batteries, although any suitable rechargeable batteries may be used. Preferably, the batteries are sized (in terms of electrical capacity) to be able to support two I/O modules for a 3 minute period, which is currently believed to be long enough to enable structured writing of cached data to the I/O module non-volatile memory.

To transfer the power supply to come from the battery 34 instead of the primary AC mains supply a seamless cut over is performed. This is achieved, by the usual midplane 12V power supply being transferred from the power supply 32 to the battery 34. The PSU fan power usually taken from PSU/Midplane 12V is instead taken from the Battery. The power supply also provides monitoring and control of the battery.

The power supply is also arranged and configured to provide battery system charging as will be described in greater detail below. In addition, the power supply provides monitoring and control of the battery. To minimise the PSU overhead for non-battery back-up systems, these functions are preferably provided by the battery pack itself.

Upon restart of the system, the system is arranged to check the non-volatile storage and complete the stored transactions, then flush the non-volatile storage ready for re-use. In addition, the system is configured to check the battery system charge status and re-charge/cycle as necessary. Last, the system is arranged to send any diagnostic logs created whilst Host access was removed to Host/Support personnel.

To maximise the time available to complete the operation, i.e. to flush data to non-volatile storage and to minimise the peak current requirements, the system is arranged to shut down all ancillary or unnecessary items. In this case, since the primary power source, e.g. AC mains, has failed, the disk drives themselves are deemed 'unnecessary'. Thus no effort is made to write data to the disk drives which are instead gracefully powered down. Instead, whatever data there is in RAM is written to some form of non-volatile storage.

Cooling needs to be maintained. In particular, some I/O modules 26 contain processors which can quickly overheat and fail. Similarly, the high current discharge from the battery could cause self-heating which would need to be dissipated.

Preferably, the battery is user-serviceable so that it can be maintained when the power supply monitoring and associated control circuits advised.

Importantly, the battery back-up system as described herein removes the need for batteries etc in the I/O module 26 and thus places minimal requirements on the I/O module. Furthermore, the removal of the back-up battery from the I/O module increases the available volume within the I/O module for processing. Since the back-up battery is a system level back-up, the same battery back-up system could be used to provide back-up to a number of different system functions or I/O module variants. Thus, instead of having to provide a dedicated back-up battery system for each and every I/O module, in some cases it might be possible for more than one I/O module to share a common back-up power supply.

The present back-up power system and configuration enables a system holdup to be performed. To achieve this, the required power is minimised by using Disk Drive power control, i.e. cutting power to the disk drives when primary power source is lost. A battery back-up system is provided and a method by which a controlled cut over from AC power to battery power can be achieved. In addition, system cooling power and control is integrated. System cooling power is taken from the enclosure 12V rail so that it is redundant and hence supports all of the fans even if there is a PSU failure. Control could take two forms. In one example, when the PSU detects that it has lost its control signals the fans are set to full power to maintain cooling. In an alternative, when the system recognises that it has lost its AC power, the fans are put to full power, or, the system determines that it still has fan control and adjusts the cooling according to the thermal environment within the enclosure.

The system allows for a back-up capability in high density I/O modules that do not have space to fit a battery. Thus the system is more power and space efficient than an external UPS system. By writing data to non-volatile storage the time limit problem encountered when volatile memory is continually self-refreshed is overcome.

In an alternative, instead of a back-up battery power supply, an external UPS system may be used as the back-up power supply to perform similar functions. However, an external UPS system will, by definition, be not as closely integrated, and the external UPS system is likely to need to be sized to the system requirement including the disk drives since it is unlikely to be able to turn them off before the primary AC mains power is lost.

FIG. 2B shows a schematic representation of a long hold ATX system 15. Like the example of FIG. 1B described above, a PCI RAID card 11 is provided. However, in contrast to the system of FIG. 1B, in the present example, a battery 17 is provided separately from the PCI RAID card. Thus, space on the PCI RAID card is not used up by the battery.

Figure 3:
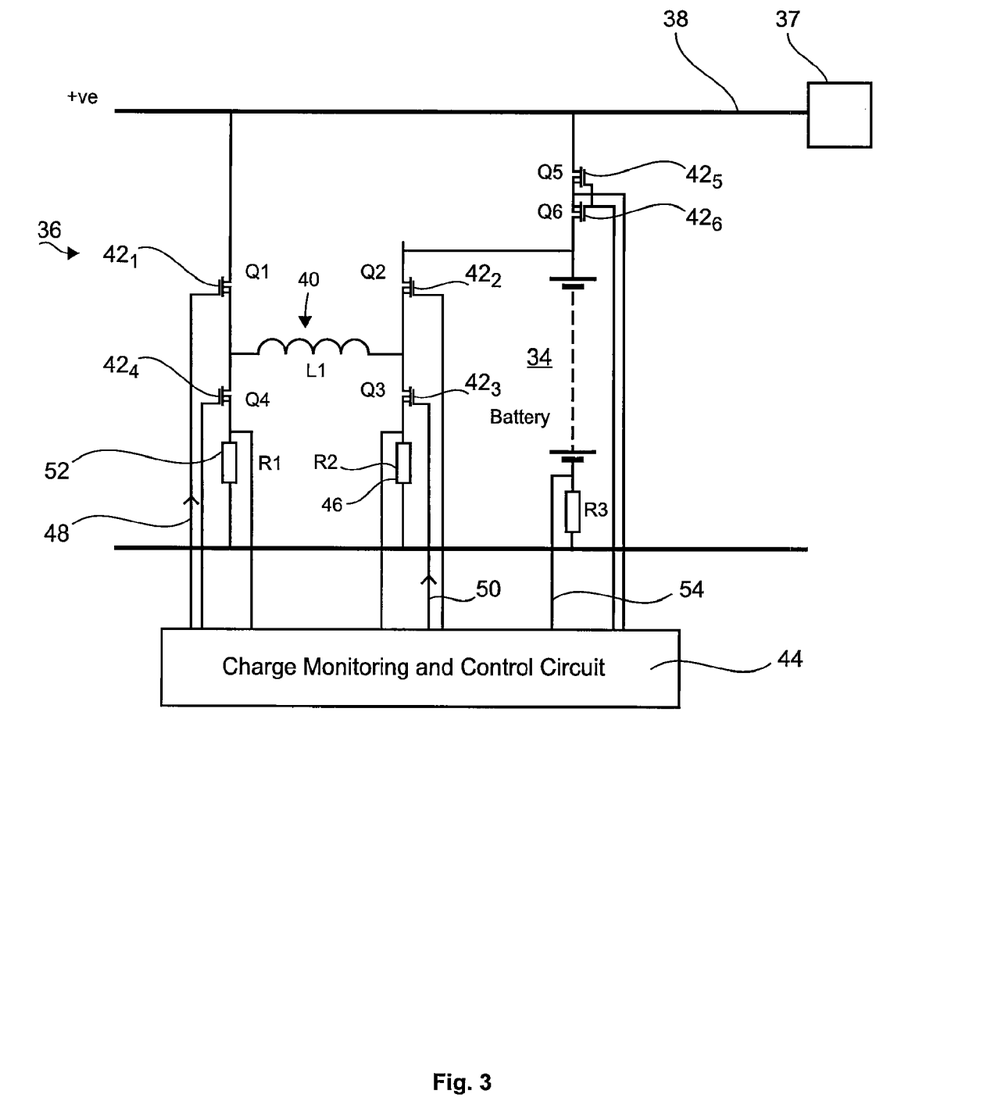
FIG. 3 is a schematic representation of a battery charging circuit.

As explained above, it is important that the back-up power supply is maintained at levels appropriate for use at short notice. To achieve this, a battery charging and control circuit is provided. FIG. 3 is a schematic representation of an example of such a battery charging and control circuit.

The circuit comprises a modified buck-boost switch-mode power stage configured to allow controlled charge and discharge of a battery or battery pack 34 from and to a fixed supply rail 38. The fixed supply rail 38 is arranged in normal use to receive power from an AC mains supply 37, shown schematically. The AC mains supply may be thought of as the primary power source for the data storage system. The supply rail 38 is electrically connected to components within the data storage system such as the I/O modules to provide the required power to them and to the system cooling fans.

The charging voltage for the battery 34 may be greater than or less than the supply rail voltage. The power stage is controlled by a coulomb-monitoring charge management system or Charge Monitoring which undertakes periodic discharge and re-charge cycles to monitor the change of battery capacity over time. The charge control circuit is arranged and configured to report battery charge information to the storage system control system and receive information from the storage system control system to determine the level of charge that may be applied to the battery within the overall system power capacity and when discharge cycles should be undertaken.

The charge and discharge circuit 36 is configured to allow charging of the battery 34 from a supply rail 38 by means of a modified swinging choke 'buck-boost' converter. The circuit 36 comprises an arrangement of four transistors $42_1$ to $42_4$ together with an inductor 40. A Charge Monitoring and Control circuit 44 is arranged to provide control signals to the transistors and other components within the circuit 36 so as to ensure that the battery charge is controlled as required. In other words, power is provided from the normal power supply rail 38 to an inductor 40, and from the inductor it is provided to charge the battery. Accordingly, voltage "overhead" discussed above is not required. This provides the significant advantage that when the system is switched to the back-up power supply there is potentially no drop in the voltage of supplied power.

The inductor 40, L1 is connected to a bridge arrangement of switching circuits made up, in this example, of four transistors Q1-Q4 $42_1$ to $42_4$. Transistors Q1 and Q3 make up a first switching circuit through which the inductor can be provided with power from the power rail 38. Transistors Q2 and Q4 make up a second switching circuit. A third switching circuit, described in greater detail below, is made up of transistors Q5 and Q6. Transsistor Q1 $42_1$ connects one end of the inductor L1 40 to the positive supply rail 38 and Q3 $42_3$ connects the opposite end to the return line via a current sense resistor, R2 46.

To initiate current flow through the inductor L1 40, both transistors Q1 $42_1$ and Q3 $42_3$ are turned on by the provision of appropriate control signals 48 and 50 to the gates of the transistors from the Charge Monitoring and Control circuit 44. At a defined or pre-determined level of current detected through the resistor R2 46, transistors Q1 and Q3 are turned off. In response to this, the voltage across the inductor L1 40 reverses and current then flows through the diodes of transistors Q2 $42_2$ and Q4 $42_4$ into the battery 34. Conduction of the diodes in the transistors Q2 $42_2$ and Q4 $42_4$ is detected by the Charge Monitoring and Control circuit 44 and the transistors are turned on at this point to minimise the conduction losses. The charging current to the battery is monitored through current sense resistor R1 52. It will be appreciated that the transistors are acting as switching circuits under control of the control signals provided by the Charge Monitoring and Control circuit 44.

When the current through the inductor L1 40 has decayed to zero, transistors Q2 and Q4 are switched off by the Charge Monitoring and Control circuit 44. Transistors Q1 and Q3 are then turned on by the Charge Monitoring and Control circuit 44 in the same manner as before to continue the process. The Charge Monitoring and Control circuit 44 may be embodied as an ASIC or FPGA or any other suitable circuit means. In one embodiment, the Charge Monitoring and Control Circuit 44 is provided as analogue circuits in conjunction with a FPGA.

The level of current through inductor L1 40 at which transistors Q1 $42_1$ and Q3 $42_3$ are turned off will be determined by the storage system control system dependent on system demands and battery capacity. This is communicated to the battery charging circuit by a suitable interface (not shown).

During normal operation of the storage system, by reversing the sequence of events, the battery 34 may be discharged into the supply rail 38. To do this, transistors Q2 $42_2$ and Q4 $42_4$ are initially turned on to initiate current through inductor L1 40. When the current has reached a defined or pre-determined level, the transistors Q2 $42_2$ and Q4 $42_4$ are switched off and the subsequent voltage reversal across the inductor discharges the inductor's stored energy into the supply rail via transistors Q1 $42_1$ and Q3 $42_3$.

The charge and discharge currents to and from the battery 34 are sampled by the coulomb counting charge management circuit 44, e.g. via the connection numbered 54, to facilitate real-time monitoring of the battery condition. The charge and discharge circuit 36 is arranged to ensure that the power level of the battery 34 is maintained at some desired level. Typically this might be a threshold level such as, say, 95% of maximum battery capacity. When it is detected that the battery charge has fallen to or below this threshold level a charging cycle is initiated.

A means for switching the power supply from the battery to the supply rail 38 is provided for use when there is a loss of normal power, e.g. from AC mains. In one embodiment, a high current capable bi-lateral switch is provided. In this particular example, transistors Q5 $42_5$ and Q6 $42_6$, allows connection of the battery 34 to the supply rail 38 to provide back-up power to the storage system in the event of an AC power failure. The bi-lateral switch is configured to reduce the power loss when the battery is providing back-up power to the supply rail but ensures low leakage current in either direction when in the 'off' state. Adaptive slew rate control of the bi-lateral switch provides for a controlled connection of the battery pack to the supply rail to minimise abrupt voltage fluctuations during the power transition. Turn-on of the bi-lateral switch is initiated when the voltage of the decaying primary (AC) power source approaches the battery voltage. The rate of application of the gate voltage is then adjusted by monitoring the rate at which the rail voltage is falling. Thus, a smooth transition to back-up power is enabled.

An interlock signal is provided to ensure that all functions are inhibited when the battery and control circuit are removed from the enclosure. The interlock may take the form of one or more pins on the mating connections between the battery pack and the power supply and between the power supply and the midplane. The pin or pins provide a "first break last make" function and the circuits associated with the pins ensure all power outputs are inhibited when the supply or battery pack are removed from the system. Preferably, the one or more pins are short pins, i.e. short in comparison to the dimensions of the connectors.

Thus, with the circuit described herein charging and discharging of a back-up battery from and to a supply rail is made possible, where the voltage relationship of the battery 34 and supply rail 38 may change in magnitude and polarity.

Power losses are minimised to ensure maximum power efficiency and minimum additional burden for system cooling. The back-up power system is also configured and arranged to enable periodic measurement of the battery capacity such that the system can report the overall battery health and indicate when replacement of the battery is necessary.

The system described herein for charging and controlling a battery pack for use as an auxiliary power source provides significant advantages. First, discharge of the battery pack into the supply rail 38 ensures maximum use of the stored energy, minimum additional heating and saves the cost of the discharge resistors. Second, the system allows the back-up voltage to be significantly closer to the nominal rail voltage so reducing the level of disturbance at the transition from primary to auxiliary power source, i.e. from AC mains to battery power. Third, the system can function to monitor the status of the back-up battery thus reducing the risk of system failure during a primary power source, e.g. AC mains, failure. In addition the battery back-up power source is more power, cost and space efficient than an external UPS.

The circuit function provided by the system described herein provides the ability to charge and discharge a back-up battery from and to the supply rail which it supports irrespective of the polarity or magnitude (within limits) of the voltage difference between them and with minimal disturbance of the supply voltage during the charge and discharge cycles. Furthermore, it enables control of the connection of the battery to the supply rail when the battery is required to support the rail in a manner such as to minimize power loss and abrupt voltage fluctuations during the transition. The system provides for efficient charge and discharge of the batteries to maximize power usage and minimize additional thermal load applied to the system cooling.

Embodiments of the present invention have been described with particular reference to the examples illustrated. However, it will be appreciated that variations and modifications may be made to the examples described within the scope of the present invention.

The invention claimed is:

1. A data storage system, comprising:
   an interface to which one or more data storage media, in use, are connected;
   a system power rail through which power within the system is distributed and being arranged to supply power to components of the data storage system;
   at least one input/output system for providing control of data transfer between each of the data storage media and one or more hosts to which, in use, the data storage system is connected; and
   a rechargeable back-up power supply coupled to the system power rail to provide power to the at least one input/output system in the event of a failure of primary power source therefor, the rechargeable back-up power supply being provided separately from the at least one input/output system.

2. The data storage system according to claim 1, in which, in the event of a failure of power from a primary power source, the power to the one or more data storage media is cut.

3. The data storage system according to claim 1, in which back-up power supply is a rechargeable battery module.

4. The data storage system according to claim 1, in which a single back-up power supply is provided for plural I/O systems.

5. The data storage system according to claim 1, wherein the system power supply rail being is arranged to provide power to charge the back-up power supply when the primary power source is operative.

6. The data storage system according to claim 1, in which the I/O system includes an ATX server having RAID functionality and in which the back-up power supply is provided separately from the ATX server.

7. A method of providing back-up power to a data storage system comprising one or more data storage media, a midplane to which the one or more data storage media arc, in use, connected, a system power rail through which power within the system is distributed and being arranged to supply power to components of the data storage system, at least one input/output system for providing control of data transfer between the or each of the data storage media and one or more hosts to which, in use, the data storage system is connected; and a back-up power supply coupled to the system power rail to provide power to the input/output systems in the event of a failure of regular power sources therefor, the method comprising:
   in the event of failure of a primary power supply for the data storage system, shutting down power to the one or more data storage media thereby reducing power requirements, of the data storage system.

8. The method according to claim 7, comprising, in the event of failure of the primary power supply for the data storage system providing the power from the back-up power supply.

9. The method according to claim 7, comprising in the event of failure of the primary power supply for the data storage system, writing data stored in volatile memory within the I/O system to non-volatile memory.

10. The method according to claim 7, comprising smoothly transferring power supply from the primary power supply to the back-up power supply in the event of primary power supply failure.

11. The method according to claim 9, comprising establishing a log of data writing events to facilitate access to written data upon resetting of the system.

12. A back-up power supply charging circuit, for connection to a power rail of a data storage system, the back-up power supply charging circuit being arranged to charge a back-up power supply for the data storage system, the circuit comprising:
   an energy storage device for receiving energy from said power rail;
   a first switching circuit for enabling power to be provided to the energy storage device from the power rail while isolated from the back-up power supply; and
   a second switching circuit for enabling power to be transferred from the energy storage device to a back-up power source for charging.

13. The back-up power supply charging circuit according to claim 12, in which the energy storage device is an inductor.

14. The back-up power supply charging circuit according to claim 12, comprising a control circuit arranged to provide control signals to the first and second switching circuits to control power flow to and from the energy storage device.

15. The back-up power supply charging circuit according to claim 14, in which the first switching circuit includes transistors under control of the control circuit.

16. The back-up power supply charging circuit according to claim 14, in which the second switching circuit includes transistors under control of the control circuit.

17. The back-up power supply charging circuit according to claim 14, in which the control circuit is arranged to monitor the charge of the back-up power supply to which, in use, the back-up power supply charging circuit is connected.

18. The back-up power supply charging circuit according to claim 12, comprising a third switching circuit arranged to enable connection of the back-up power supply to the power rail to provide power thereto in the event of a primary power source failure of the data storage system.

19. The back-up power supply charging circuit according to claim 18, in which the third switching circuit includes transistors under control of a control circuit.

20. The back-up power supply charging circuit according to claim 14, in which the control circuit is provided as one or more of an ASIC or an FPGA.

21. A method of charging a back-up power supply for a data storage system, the back-up power supply being arranged to provide power to the data storage system in the event of the failure of a primary power source and being, in use, connected to a power supply rail of the data storage system, the method comprising:
  when power is available from the primary power source, activating a first switching circuit to enable power to be provided to an energy storage device from the power rail while isolated from the back-up power supply; and,
  subsequently, activating a second switching circuit to enable power to be transferred from the energy storage device to the back-up power supply for charging.

22. The method according to claim 21, comprising monitoring the power level of the back-up power supply and activating a charging cycle when the level reaches a defined level.

23. The method according to claim 21, in which the first switching circuit comprises transistors under control of a control system and the step of activating the first switching circuit comprises:
  sending control signals to the transistors to enable power to be provided to the energy storage device.

24. The method according to claim 21, in which the second switching circuit comprises transistors under control of a control system and the step of activating the second switching circuit comprises:
  sending control signals to the transistors to enable power to be transferred from the energy storage device.

25. A rechargeable back-up power supply for a data storage system, the back-up power supply comprising one or more rechargeable batteries; a back-up power supply charging circuit, for connection to a power rail of a data storage system, the back-up power supply charging circuit being arranged to charge a back-up power supply for the data storage system, the circuit comprising: an energy storage device for receiving energy from said power rail while isolated from the back-up power supply; a first switching circuit for enabling power to be provided to the energy storage device from the power rail; a second switching circuit for enabling power to be transferred from the energy storage device to the back-up power supply for charging; and a third switching circuit arranged to enable connection of the one or more rechargeable batteries of the back-up power supply to the power rail to provide power thereto in the event of a primary power source failure of the data storage system.

26. A method of providing back-up power to a data storage system in the event of primary power source failure, the data storage system comprising a power supply rail from which power is provided to components of the data storage system, the method comprising:
  providing a back-up power supply according to claim 25;
  in the event of primary power source failure, smoothly switching to the back-up power source by activating the third switching circuit.

27. The method according to claim 26, in which the step of smoothly switching to the back-up power supply by activating the third switching circuit comprises active slew rate control.

* * * * *